June 5, 1945.   E. B. BURRELL   2,377,322
SOLDERING DEVICE
Filed July 2, 1941

Inventor:
Ellis B. Burrell
By: Roland C. Rehm
Atty.

Patented June 5, 1945

2,377,322

UNITED STATES PATENT OFFICE 2,377,322

SOLDERING DEVICE

Ellis B. Burrell, Chicago, Ill., assignor to Jiggers, Incorporated, Chicago, Ill., a corporation of Illinois Application July 2, 1941, Serial No. 400,751

6 Claims. (Cl. 113—110)

This invention relates to soldering devices and, among other objects, aims to provide an improved self-soldering device which is protected against deterioration and entry of foreign matter and may be made at relatively low cost.

The nature of the invention may be readily understood by reference to one illustrative device and its method of manufacture embodying the invention and shown in the accompanying drawing.

Figure 1:
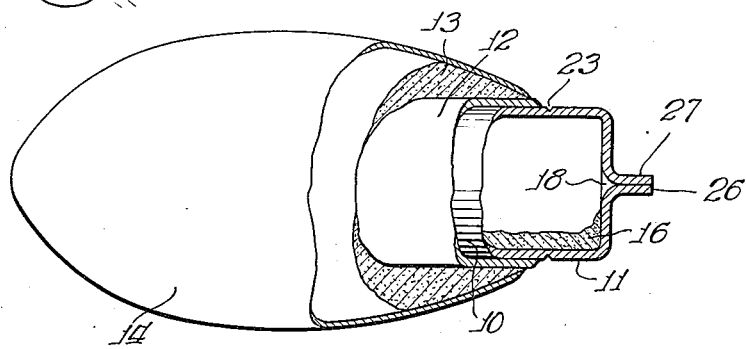
Fig. 1 is a large scale elevation partly in section of one of the soldering devices.

The illustrative soldering device is of the type disclosed in my prior Patent No. 2,146,393, which is characterized by a frangible or non-metallic solder holder surrounding the solder and flux, and a heat supplying compound adhering to the exterior of the solder holder.

The improved soldering device is manufactured in such a way as to provide protection for the flux on the interior of the device and to prevent entrance of dirt and other foreign matter which would interfere with the soldering action. As here shown, the solder shell 10 is provided with a removable closure in the form of a separable cap 11 which closes the interior of the shell and may be manually removed when the device is to be used. The complete unit comprises the solder-retaining element or holder 12 in the form of a thin shell on the exterior of which is the heat supplying compound 13. The solder holder should preferably comprise some material to which solder will not adhere, and may advantageously be made of any cementitious material capable of withstanding the moderate temperature developed by the heating compound. Its function is to hold the molten solder and flux in contact with the metal to be soldered, and to prevent access to the point of application of solder of the fumes, etc., from the heat supplying compound. One form of material is a refractory cement or enamel made from flint clay and sodium silicate, and may be applied in slurry or liquid form and dried directly on the solder shell 10. An enamel of this character dries quickly and forms a relatively strong refractory shell which is nevertheless so thin that it does not substantially retard transmission of heat to the solder and the wire splice or the like to be soldered thereby.

The solder-retaining shell may advantageously be formed simply by dipping the solder shell into the cement or clay slurry and subsequently drying. The thickness of the coating is regulated by the number of dippings. In the present instance, one dipping develops an adequate shell. Preferably immersion of the solder element in the coating compound should terminate at the cap 11 so that no coating will be applied to the latter.

The heat supplying material 13 is advantageously some substance which may be ignited readily by a match and which preferably will burn without substantial flame or sparks. Such compounds are similar to materials used in manufacture of pyrotechnics but different therefrom largely in the absence of flame and sparks.

The illustrative heat supplying material comprises an oxygen supplying material such as barium nitrate, an oxidizable substance, such as powdered iron or powdered aluminum or both, whose combustion supplies the necessary heat, and a binder which binds the substances together. One satisfactory formula for a heat supplying compound of this character is as follows:

| | Parts by volume |
|---|---|
| Barium nitrate | 4 |
| Powdered iron | 2 |
| Aluminum powder | 1 |
| Binder, such as gum arabic | 1 |
| Safety match compound, for facilitating ignition | 4/5 |

The iron employed should preferably not be coarser than 100 mesh. The aluminum functions to increase the intensity of the heat, and this may be regulated by the proportion of aluminum powder. The match compound facilitates ignition and for reasons which are not understood suppresses flame which would otherwise develop from the burning of the binder compound.

The ingredients are preferably mixed with water into a slurry or thick cream and applied by dipping the unit therein and subsequently drying. Dipping and subsequent drying is repeated as often as necessary to apply the necessary amount of compound. In the present instance, an adequate coating of burning compound will develop with two dippings.

Preferably a waterproof protective film 14 is applied to the exterior of the heat supplying compound to prevent oxidation or other deterioration of the burning compound. This protective film is preferably either incombustible or, if combustible, burns without substantial flame. A thin coating of a suitable silicate, varnish, lacquer or the like is satisfactory for this purpose.

Figure 2:
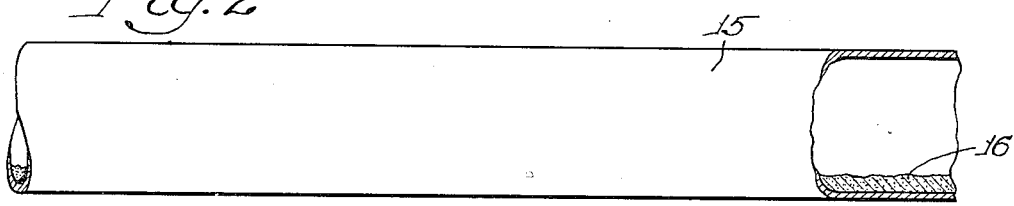
Fig. 2 is an elevation of a tubular solder unit from which the soldering device is made.

The protective cap 11 is formed in the present instance by spinning or drawing down a thin walled tube of solder. This may advantageously be effected as here shown by extruding the solder in a thin walled tube 15 (Fig. 2), whose internal diameter is determined by the size of wire splice or other element to be soldered. The internal diameter of the tube should be sufficient to permit the soldering device to slip easily over the splice. An internal diameter of about ⅛ of an inch (actually, .156" in the present case) is satisfactory for most purposes. With a wall thickness of about .007", ample solder is provided for any splice or other article of a size to enter the shell. For larger sizes, it may be desirable to increase the thickness of the solder shell. The tube is formed from small solder billets by means of an extrusion press into tubes of convenient length which may, if desired, be connected end to end for convenience in subsequent handling and fabrication to form in effect continuous tubing. The solder in this instance is of medium hardness comprising 50% lead and 50% tin. As the tube is extruded, flux, in this case in the form of a paste, is advantageously introduced through an opening in the extrusion die to deposit a ribbon 16 of flux inside the tube. Introduction of paste flux obviates the use of heat which might soften or collapse the solder tube.

Figure 3:
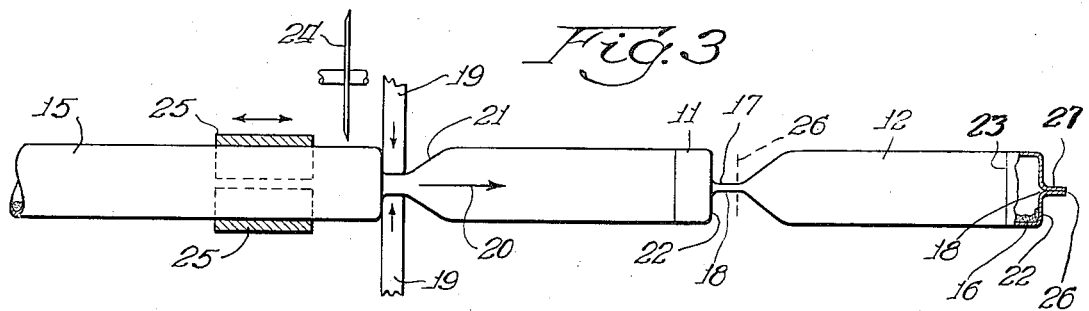
Fig. 3 shows the unit at a later stage of fabrication.
Figure 4:
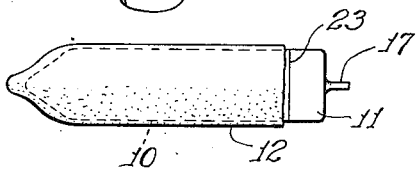
Fig. 4 is an elevation showing the solder device at an intermediate stage of completion.

After its formation the tube is then necked down as at 17 (Fig. 3) at spaced points along its length to provide a chain of connected solder shells. The necking or spinning operation is preferably continued until the tube is substantially closed as at 18 at opposite ends of the solder shell. This operation may advantageously be performed by holding the tube stationary and engaging it on opposite sides by a pair of blunt spinning tools 19 which are rotated around the stationary tube and simultaneously gradually approach each other. The spinning operation causes an elongation of the tube and the latter is permitted to expand in the direction of the arrow 20, Fig. 3 (the tube being held against longitudinal movement in the other direction), thereby forming an elongated neck which is tapered as at 21 at the lower end of each solder shell and has a relatively square shoulder 22 adjacent the cap 11. In other words, the taper at the lower end of the shell results from the elongation of the tube due to spinning and the progressive movement of a portion of the neck beyond the reach of the spinning tools 19. Only that part of the tube which remains under the spinning tools is completely restricted as at 18. After the necking operation has been completed the tools 19 are retracted and the tube is advanced (to the right in Fig. 3) to the next reduction point.

At some stage in the foregoing operations on the tube and preferably simultaneously with the reduction operation the solder shell is partially severed as at 23 adjacent the top of each element to provide the cap 11. The depth of the cut should be sufficient to permit easy manual removal of the cap by inserting one's finger nail in the cut but care should be taken not completely to sever the solder. The cutting device may comprise a rotatable sharp disc 24 which may be mounted on the rotating device carrying the spinning tools 19 and adjusted to contact with the solder tube just before the completion of the spinning operation so that the depth of cut 23 will be limited and the solder tube will not be completely severed.

During the spinning operation, the solder tube may advantageously be inflated with air under pressure to hold the tube to its circular section during spinning and particularly to restore it to true circular section in the event of partial collapse during handling. A holder 25 in the form of a releasable jaw clamp is diagrammatically indicated in Fig. 3. The clamp holds the tube stationary during spinning and is advantageously made reciprocable longitudinally of the tube (as indicated by the double arrow) to advance the latter a predetermined distance after each spinning operation.

After reduction the solder shells are severed from each other by cutting the same at 26 close to the lower end of the solder shell so as to leave a neck 27 projecting from the cap by means of which the shells may be grasped by an appropriate device for the subsequent dipping operations. Preferably a series of shells are thus gripped and simultaneously carried through the dipping operations above described. The spinning operation closes the lower end of the shell sufficiently to prevent entrance into the interior of the material which forms the exterior solder holding shell.

The completed soldering elements are thus closed at both ends and entry of dirt and deterioration of the flux inside the solder shell is prevented. The solder shells are preferably not immersed above the cut 23 to leave the caps 11 free of coating which might interfere with facile removal upon use. After the device with the cap removed has been slipped over the splice or other element to be soldered the heat supplying compound is ignited to melt the solder. Escape of molten solder is prevented by the solder holding shell 12 which holds the solder and the flux in contact with the metal to be soldered, thus cleaning and heating it to cause the solder to flow adequately over the metal. Various types of standard flux may be used. A so-called acid paste (of a non-corrosive type) is advantageous both because it is efficient and because in its paste form it may be readily introduced into the solder shell without the use of heat. There is no tendency for the solder to adhere to the solder holding shell and the same may be readily removed after the solder has hardened.

Figure 5:
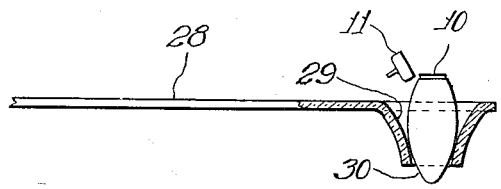
Fig. 5 illustrates a holder for applying the soldering device to a splice.

In Fig. 5 is illustrated a holder 28 by means of which a solder device (with the cap 11 removed) may be held for application to depending splices or other elements so located as not to provide any support for the solder element. The holder 28 may comprise a strip of asbestos (about ⅛" thick) pierced while wet (or otherwise softened) to form a pocket 29 for holding a soldering device with its lower end projecting as at 30 in an exposed position for ignition. By this means a single soldering device may be employed to solder a plurality of splices. The holder 28 may be stiffened by soaking with sodium silicate and later drying.

Obviously the invention is not limited to the details of the illustrative device or its method of manufacture since these may be variously modified. Moreover, it is not indispensable that all features of the invention be used conjointly since various features may be used to advantage in different combination and subcombinations.

Having described my invention, I claim:

1. A soldering device comprising in combination a solder shell containing flux on its interior and of such internal diameter as to adapt it to be placed around the element to be soldered, said shell being closed at one end and having a removable closure at the other end thereby to protect the flux against contamination until use of the shell, means on the exterior of the shell for generating heat to fuse the solder, and a coating over the heat generating means to prevent oxidation and deterioration of the latter.

2. A soldering device comprising in combination a solder shell adapted to be placed around the element to be soldered and containing a flux on its interior, said shell being closed at one end and having a removable closure at the other end integral with the shell thereby protecting the flux against contamination until use of the shell, said shell being scored adjacent the closure end to weaken the solder shell to permit easy severance of the closure from the body of the shell, and means on the exterior of the shell for generating heat to fuse the solder.

3. A soldering device comprising in combination a solder shell adapted to be placed around the element to be soldered, said shell being formed of a solder tube having a thin wall to provide solder only sufficient to solder an article inserted inside the shell, said tube being reduced in diameter at each end to close the shell and being weakened adjacent one end to provide a removable cap sealing the interior of the shell, and means on the exterior of the shell for generating heat to fuse the solder.

4. A soldering device comprising in combination a hollow solder shell adapted to be placed around the element to be soldered, a heat generating compound on the exterior of the shell, and a coating on the exterior of said heat generating compound to prevent oxidation and deterioration of the latter.

5. A soldering shell comprising a hollow tube of solder having an internal diameter large enough to slip over the element to be soldered, the walls of said tube being thin but providing suficient solder to solder the said element, said tube being restricted in diameter at each end so as substantially to close said tube at each end and being weakened adjacent one end to permit the tube to be severed adjacent one end to expose its interior.

6. A soldering device comprising in combination a soldering shell adapted to be placed around the element to be soldered, said shell being formed of a solder tube closed down at each end so as substantially to seal the interior of the shell, said solder tube having a thin wall adapted to be fractured adjacent an end to open the interior and permit insertion of the element to be soldered, said thin solder wall of the shell providing solder only sufficient to solder the element inserted in the shell, and heat generating means on the exterior of the shell to generate heat to fuse the latter for soldering the said element.

ELLIS B. BURRELL.